United States Patent [19]

Ogura et al.

[11] Patent Number: 5,475,504
[45] Date of Patent: Dec. 12, 1995

[54] IMAGE READING DEVICE DETACHABLE FROM MAIN BODY

[75] Inventors: Makoto Ogura, Isehara; Hiroo Ichihashi, Chigasaki; Katsumi Komiyama, Isehara; Yoshikazu Sano, Kawasaki; Osamu Hamamoto, Isehara; Tetsuya Shimada, Zama, all of Japan

[73] Assignee: Canon Kabushiki Kaisha, Tokyo, Japan

[21] Appl. No.: 83,318

[22] Filed: Jun. 29, 1993

Related U.S. Application Data

[63] Continuation of Ser. No. 790,346, Nov. 12, 1991, abandoned.

[30] Foreign Application Priority Data

| Nov. 14, 1990 | [JP] | Japan | 2-309486 |
| Jan. 31, 1991 | [JP] | Japan | 3-029206 |
| Jan. 31, 1991 | [JP] | Japan | 3-029207 |
| Jan. 31, 1991 | [JP] | Japan | 3-029208 |
| Jan. 31, 1991 | [JP] | Japan | 3-029209 |
| Jan. 31, 1991 | [JP] | Japan | 3-029210 |
| Jan. 31, 1991 | [JP] | Japan | 3-029211 |
| Jan. 31, 1991 | [JP] | Japan | 3-029212 |

[51] Int. Cl.⁶ .............................. H04N 1/04; H04N 1/10; H04N 1/12; H04N 1/193
[52] U.S. Cl. .......................... 358/474; 358/494; 358/496; 358/498
[58] Field of Search .................... 358/473, 474, 358/482, 483, 494, 496, 498

[56] References Cited

U.S. PATENT DOCUMENTS

| 4,652,937 | 3/1987 | Shimura et al. | 358/473 |
| 4,768,100 | 8/1988 | Kunishima et al. | 358/285 |
| 4,920,431 | 4/1990 | Ogura et al. | 358/496 |
| 4,959,536 | 9/1990 | Ijuin et al. | 250/216 |
| 4,962,430 | 10/1990 | Hiroki et al. | 358/473 |
| 4,962,526 | 10/1990 | Kotani et al. | 358/473 |

FOREIGN PATENT DOCUMENTS

| 0051227 | 5/1982 | European Pat. Off. . |
| 0280242 | 8/1988 | European Pat. Off. . |
| 0297566 | 1/1989 | European Pat. Off. . |
| 2069982 | 9/1981 | United Kingdom . |

OTHER PUBLICATIONS

Patent Abstracts of Japan, vol. 5, No. 179, (E–82)(851), Nov. 17, 1981.

*Primary Examiner*—Scott A. Rogers
*Attorney, Agent, or Firm*—Fitzpatrick, Cella, Harper & Scinto

[57] ABSTRACT

In an original image reading device of this invention, a reading unit for reading an image on an original, an original convey unit for conveying the original, and a drive force transmission unit for transmitting a drive force from an apparatus main body to the original convey unit are integrally arranged on single support unit, so that the device is attachable to and detachable from the apparatus main body.

25 Claims, 15 Drawing Sheets

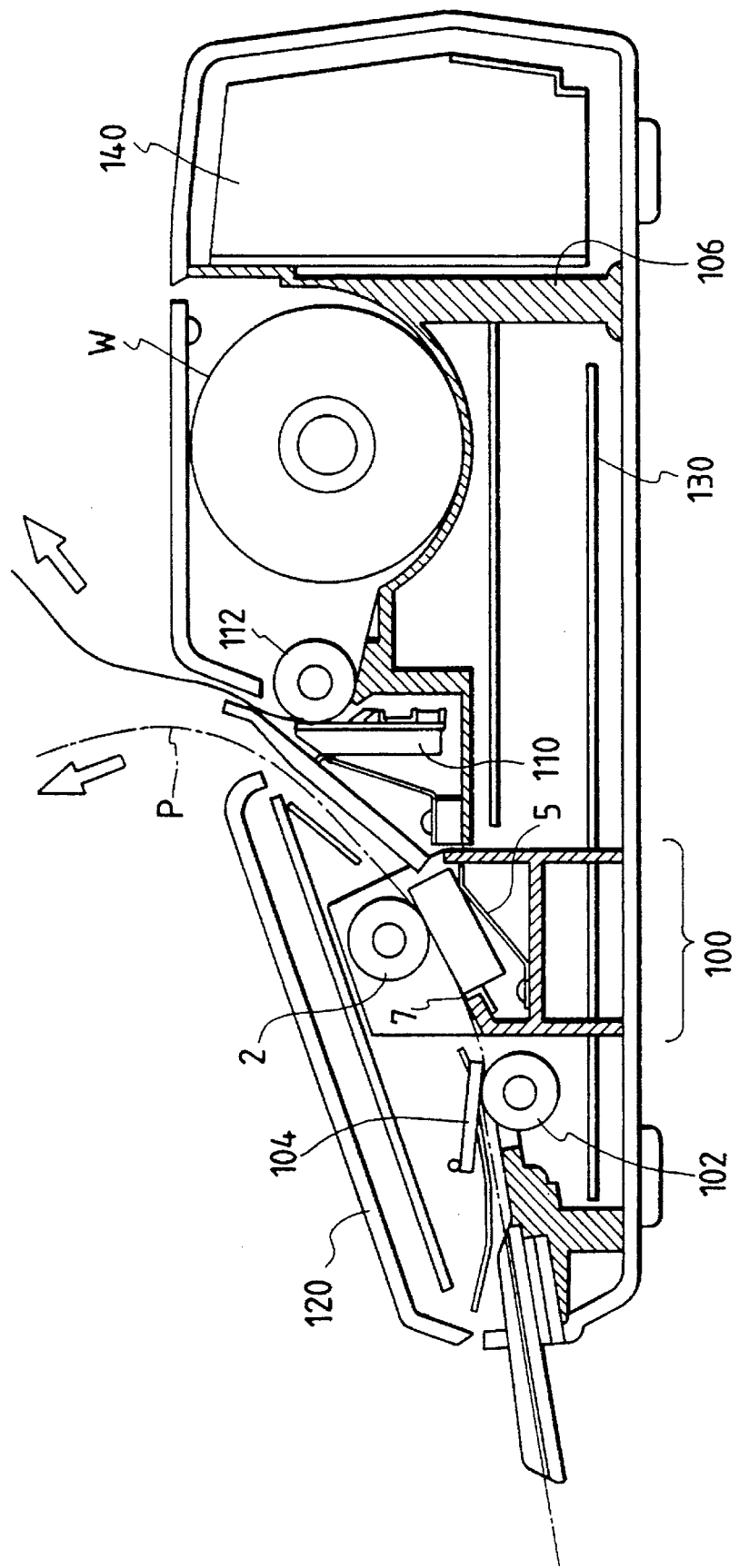

IMAGE READING DEVICE DETACHABLE FROM MAIN BODY

This application is a continuation of application Ser. No. 07/790,346 filed Nov. 12, 1991 now abandoned.

BACKGROUND OF THE INVENTION

1. Field of the Invention

The present invention relates to an original image reading device, and an image information processing apparatus mounting the device and, more particularly, to an original image reading device, applied to an image information processing apparatus such as a facsimile apparatus, an image scanner, or the like, for optically reading image information of an original, and an image information processing apparatus mounting the device.

2. Related Background Art

In recent years, requirements have arisen for compact, lightweight, and inexpensive image information processing apparatuses such as facsimile apparatuses, image scanners, and the like. Especially, in facsimile apparatuses, along with expansion of the market of home facsimile apparatuses for, e.g., a personal use, diversified requirements for designs and functions have arisen in addition to the requirements for compact, lightweight, and inexpensive apparatuses.

As an original image reading device, arranged in such an image information processing apparatus, for optically reading image information of an original, an original reading device employing a reduction reading system as a combination of a line sensor such as a CCD and a reduction optical system, as described in U.S. Pat. No. 4,768,100, a device employing a contact reading system, in which a line sensor having the same length as an original width, an equal-magnification optical system such as a convergent fiber lens array, and a light source such as an LED array are integrally assembled in a frame, as described in U.S. Pat. No. 4,920,431, a device employing a perfect contact reading system, in which a line sensor and a light source are integrally assembled in a frame without using a lens array, and an original image is read while the original is set adjacent on the line sensor, as described in U.S. Pat. No. 4,959,536, and the like are adopted.

FIG. 1 is a sectional view showing a facsimile apparatus as an example of an image information processing apparatus mounting a conventional original image reading device.

The facsimile apparatus includes an original image reading device 1. An original P is separated and fed one by one toward the original image reading device 1 by a separation segment 104 and a feed roller 102. A convey roller 2 presses the fed original P at the reading position of the original image reading device 1, so that the original P is in tight contact with the reading position. The convey roller 2 also conveys the original P. A recording head 110 records image information read by the original image reading device 1 or image information transmitted from an external device on a recording medium W. A platen roller 112 presses the recording medium W at the recording position of the recording head 110, so that the recording medium W is in tight contact with the recording position. In addition, the platen roller 112 conveys the recording medium W. An operation panel 120 is provided with switches for accepting operation inputs, and a display unit for displaying messages and states of the apparatus. The facsimile apparatus also includes a system control board 130, and a power supply 140. Note that the feed roller 102, the convey roller 2, and the platen roller 112 are coupled to drive force transmission members such as motors, gears, and the like (not shown) arranged on one or both sides in a direction perpendicular to the drawing surface, and are rotated by these members.

The above-mentioned components are integrally locked on a main body frame 106.

However, in order to meet requirements for a compact, lightweight, and inexpensive structure, and diversified designs and functions of the image information processing apparatus, the following technical subjects remain unsolved in the conventional image reading device and the image information processing apparatus.

(1) As the apparatus is rendered compact and light weight, it is difficult to assure assembling position precision. As a result, parts precision must be further improved, thus preventing the manufacture of an inexpensive apparatus.

(1-1) In the conventional image information processing apparatus, since various components are integrally locked on the main body frame, the main body frame assures rigidity of the image information processing apparatus. Therefore, as the apparatus is rendered compact and lightweight, the rigidity of the main body frame is decreased, thus impairing assembling position precision of the respective components. In particular, a decrease in rigidity of the main body frame impairs positional precision between the original image reading device and the convey roller, thus degrading image reading performance, and original convey performance.

(1-2) In order to realize a compact, lightweight apparatus, for example, the dimensions of a gear module are decreased to decrease the gear diameter. In this case, precision of the distance between the centers of gears must be further improved. As a result, it is difficult to reduce parts cost.

(2) Loads upon changes in design and function are considerable, and prevent the manufacture of an inexpensive apparatus.

(2-1) In the conventional image information processing apparatus, since various components are integrally locked on the main body frame, the shape of the main body frame determines the design of the product. Therefore, when the design is changed, the shape of the main body frame must be changed first, and the design load, cost of, e.g., molds, and cost upon a change in production equipment prevent the manufacture of an inexpensive image information processing apparatus.

(2-2) When the functions of the image information processing apparatus are changed, various loads prevent the manufacture of an inexpensive image information processing apparatus like in the change in design.

(3) Replacement and repair are not easy when a defect or malfunction is found.

(3-1) In consideration of the production process of the image information processing apparatus, after components mounting the original image reading device are assembled on the main body frame of the image information processing apparatus, the function check test of the image information apparatus is conducted. As a result of the test, for example, when a defect is found in the original image reading device, other assembled components must be disassembled from the main body frame, and the original image reading device must be replaced or repaired. Furthermore, the original image reading device must be assembled on the main body frame again, and then, adjustment must be performed.

(3-2) For example, when the original image reading device malfunctions during use of the image information processing apparatus, the original image reading device must be disassembled from the main body frame of the image information processing apparatus together with other components, and must be replaced or repaired. Furthermore, the original image reading device must be assembled on the main body frame again, and then, adjustment must be performed.

In particular, in the contact reading system, since the focal depth is relatively shallow, an original and the reading surface must be precisely aligned. In this case, when the convey roller 2 and the reading device 1 are independently locked on the main body frame 106 of the apparatus like in the conventional apparatus, it is difficult to align the roller 2 with the reading surface of the reading device 1, thus undesirably prolonging an assembling time of the overall apparatus.

SUMMARY OF THE INVENTION

It is an object of the present invention to provide an original image reading device, and an image information processing apparatus, which are easy to handle.

It is another object of the present invention to provide an original image reading device, and an image information processing apparatus, which can solve the above-mentioned technical subjects, and can meet recent requirements for a compact, lightweight, and inexpensive structure, and diversified designs and functions.

It is still another object of the present invention to provide an original image reading device, in which original reading means for optically reading an image of an original, original convey means for conveying the original, drive force transmission means for transmitting a drive force from an external unit to the original convey means, and original contact means for bringing the original to be in tight contact with a reading portion of the original reading means are integrally arranged on a frame to constitute a unit structure.

It is still another object of the present invention to provide an image information processing apparatus which detachably mounts, on its main body, an original image reading device unit, in which original reading means for optically reading an image of an original, original convey means for conveying the original, drive force transmission means for transmitting a drive force from an external unit to the original convey means, and original contact means for bringing the original to be in tight contact with a reading portion of the original reading means are integrally arranged on a frame to constitute a unit structure.

BRIEF DESCRIPTION OF THE DRAWINGS

FIG. 7 is a sectional view showing an image information processing apparatus according to the third embodiment of the present invention;

DETAILED DESCRIPTION OF THE PREFERRED EMBODIMENTS

The preferred embodiments of the present invention will be described in detail hereinafter with reference to the accompanying drawings.

(First Embodiment)

Figure 2:
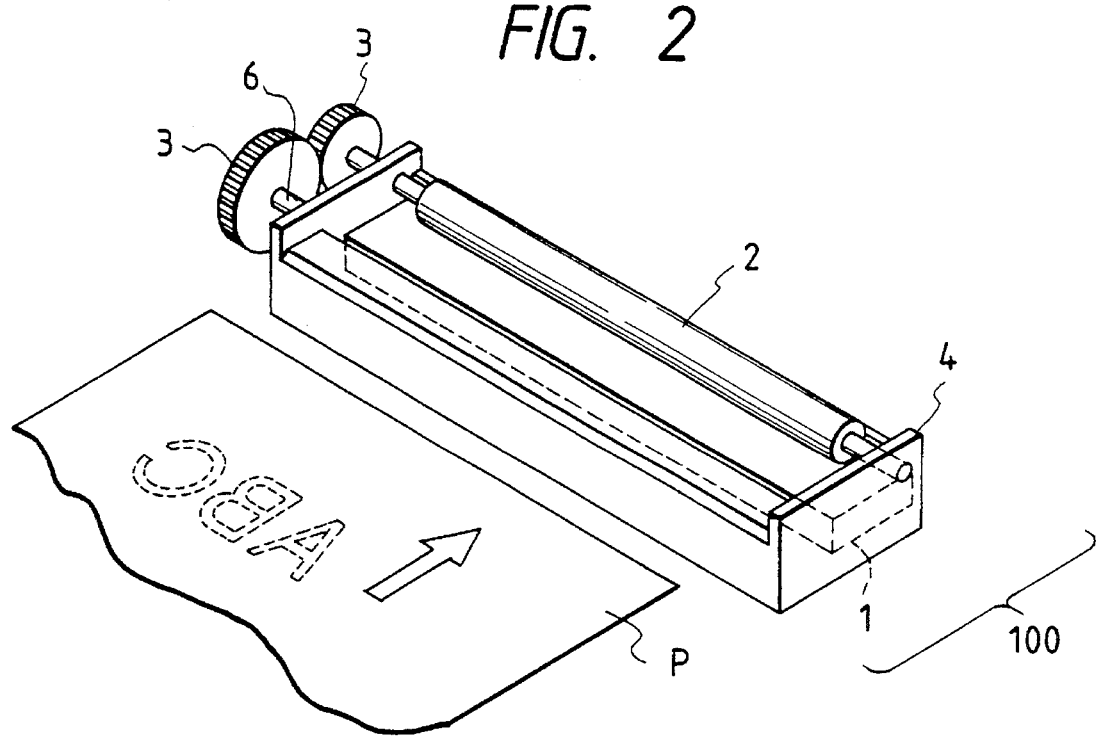
FIG. 2 is a perspective view showing an original image reading device according to the first embodiment of the present invention.
Figure 3:
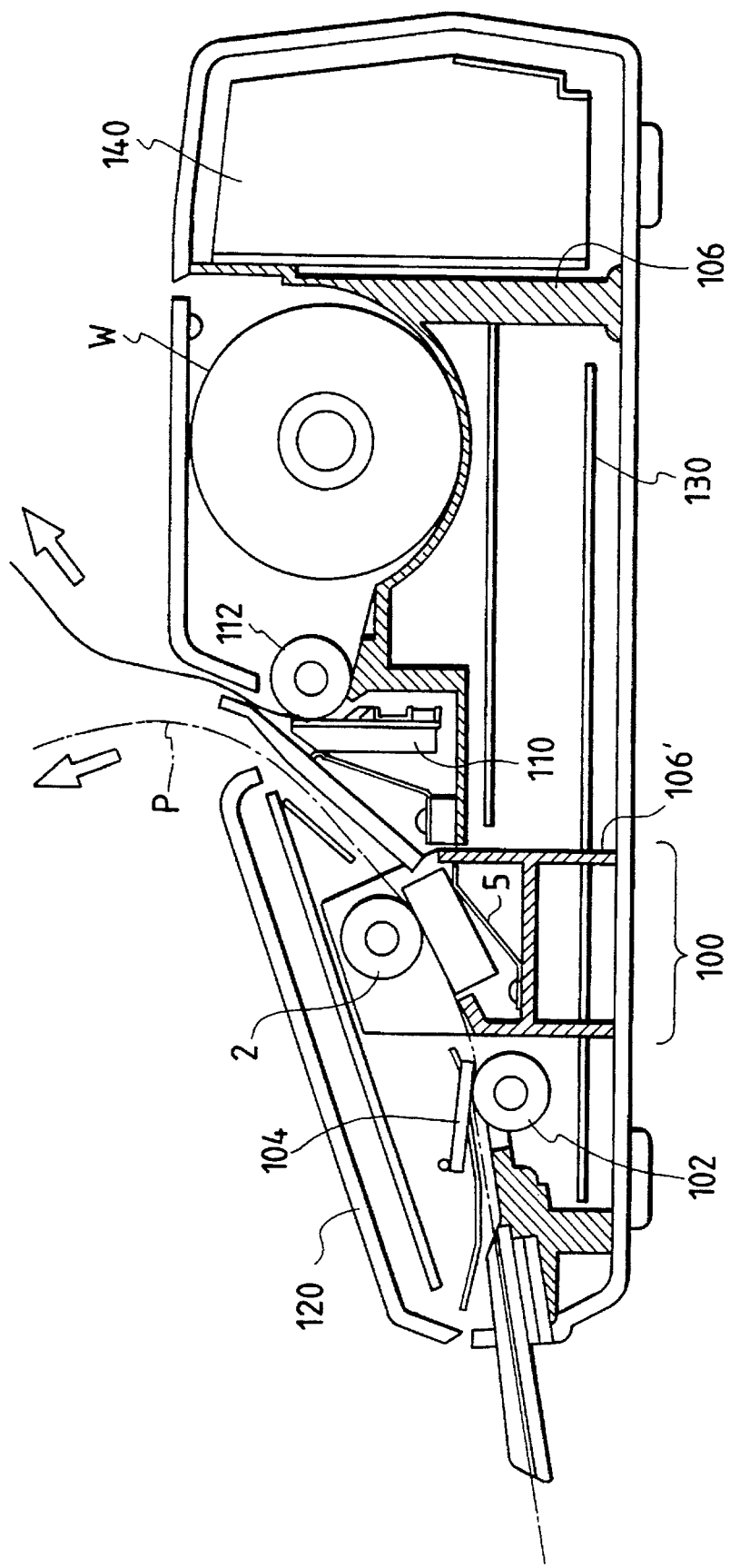
FIG. 3 is a sectional view showing an image information processing apparatus according to the first embodiment of the present invention.

FIGS. 2 and 3 schematically show the first embodiment.

FIG. 2 is a perspective view for explaining the structure of an original image reading device of this embodiment. An original image reading device 100 has a unit structure in which a line sensor 1 as an original reading means for optically reading an image of an original P, a platen roller 2 as an original convey means for conveying the original P, and also as an original contact means for bringing the original P to be in tight contact with a reading surface as a reading portion of the line sensor 1, and gears 3 as drive force transmission means for transmitting a drive force from an external unit, i.e., an apparatus main body to the platen roller 2 are integrally locked on a frame 4. Note that the gears 3 are attached to a shaft 6 arranged on the end portion of the frame, and a roller shaft. It is preferable that a spring is arranged below the line sensor 1 to urge the line sensor 1 against the platen roller 2.

FIG. 3 is a perspective view for explaining the structure of an image information processing apparatus of this embodiment, and shows a facsimile apparatus which mounts the original image reading device 100 shown in FIG. 2 at a mounting position in the main body. The original image reading device 100 is not integrally locked on a main body frame 106, but is locked on a bottom plate 106' separate from the main body frame 106. Note that FIG. 3 illustrates a spring 5 which is not shown in FIG. 2.

According to this embodiment, the original image reading apparatus, and the image information processing apparatus mounting the device, which can solve the subjects of the conventional apparatuses, can be provided for the following reasons.

1) Assembling position precision, and parts precision can be improved.

1.1) The original image reading device has a structure in which the original reading means, the original convey means, the original contact means, and the drive force transmission means are integrated on the frame, and is independently detachable from the main body frame of the image information processing apparatus. Therefore, the assembling position precision of the original image reading device does not depend on a decrease in rigidity of the main body frame upon realization of the compact, lightweight structure, thus easily assuring the assembling position precision.

1.2) Since the necessary gears are attached to the shafts arranged on the frame, the position precision can be easily assured.

1.3) Since the assembling position precision, and the parts precision can be assured, a compact, lightweight structure can be realized.

2) Loads and total cost upon changes in design and function can be reduced.

2.1) The original image reading device has a structure in which the original reading means, the original convey means, the original contact means, and the drive force transmission means are integrated on the frame, and is independently detachable from the main body frame of the image information processing apparatus. Therefore, the layout in the image information processing apparatus can be desirably made, and the degree of freedom of the design of the image information processing apparatus can be increased.

2.2) When the functions of the image information processing apparatus are to be changed, the original image reading device of this embodiment can be standardized and assembled, thus reducing design and development loads. In addition, since design evaluation and examination terms can be shortened, diversified requirements can be readily met.

3) Replacement is easy when a defect or malfunction is found.

3.1) Since the original image reading device has a structure in which the original reading means, the original convey means, the original contact means, and the drive force transmission means are integrated on the frame, the function check test of the original image reading device can be conducted before the device is assembled in the image information processing apparatus. Therefore, a defect of the original image reading device can be found early.

3.2) Even when the original image reading device malfunctions during use of the image information processing apparatus, the original image reading device unit need only be replaced. Thus, a user himself or herself can easily repair the device even if he or she has no special education, technique, and tools.

Various other embodiments based on the first embodiment will be described hereinafter. The first embodiment, and all other embodiments to be described below can be applied to facsimile apparatuses, computers, wordprocessors, copying machines, and the like, and can obtain the above-mentioned effects.

(Second Embodiment)

This embodiment is an original image reading device in which original reading means for optically reading an image of an original, original convey means for conveying the original, drive force transmission means for transmitting a drive force from an external unit to the original convey means, original contact means for bringing the original to be in tight contact with a reading portion of the original reading means, and image correction means for correcting an image read by the image reading means are integrally arranged on a frame to constitute a unit structure, so that the device is detachable from a main body. Thus, the original image reading device, which can solve the subjects of the conventional apparatuses, and can meet recent requirements for a compact, lightweight, and inexpensive structure, diversified designs and functions, a short development term, and the like, can be provided.

According to this embodiment, an image information processing apparatus detachably mounts an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and image correction means for correcting an image read by the image reading means are integrally arranged on a frame to constitute a unit structure. Therefore, the image information processing apparatus, which can solve the subjects of the conventional apparatuses, and can meet recent requirements for a compact, lightweight, and inexpensive structure, diversified designs and functions, a short development term, and the like, can be provided.

Figure 4:
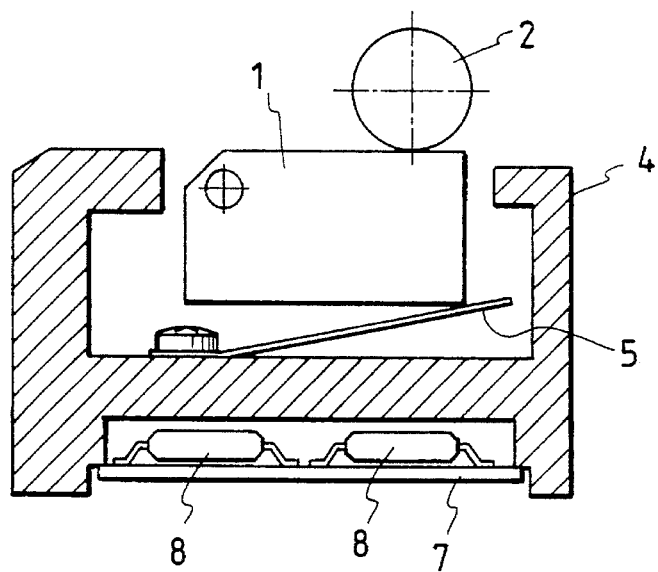
FIG. 4 is a sectional view showing an original image reading device according to the second embodiment of the present invention.
Figure 5:
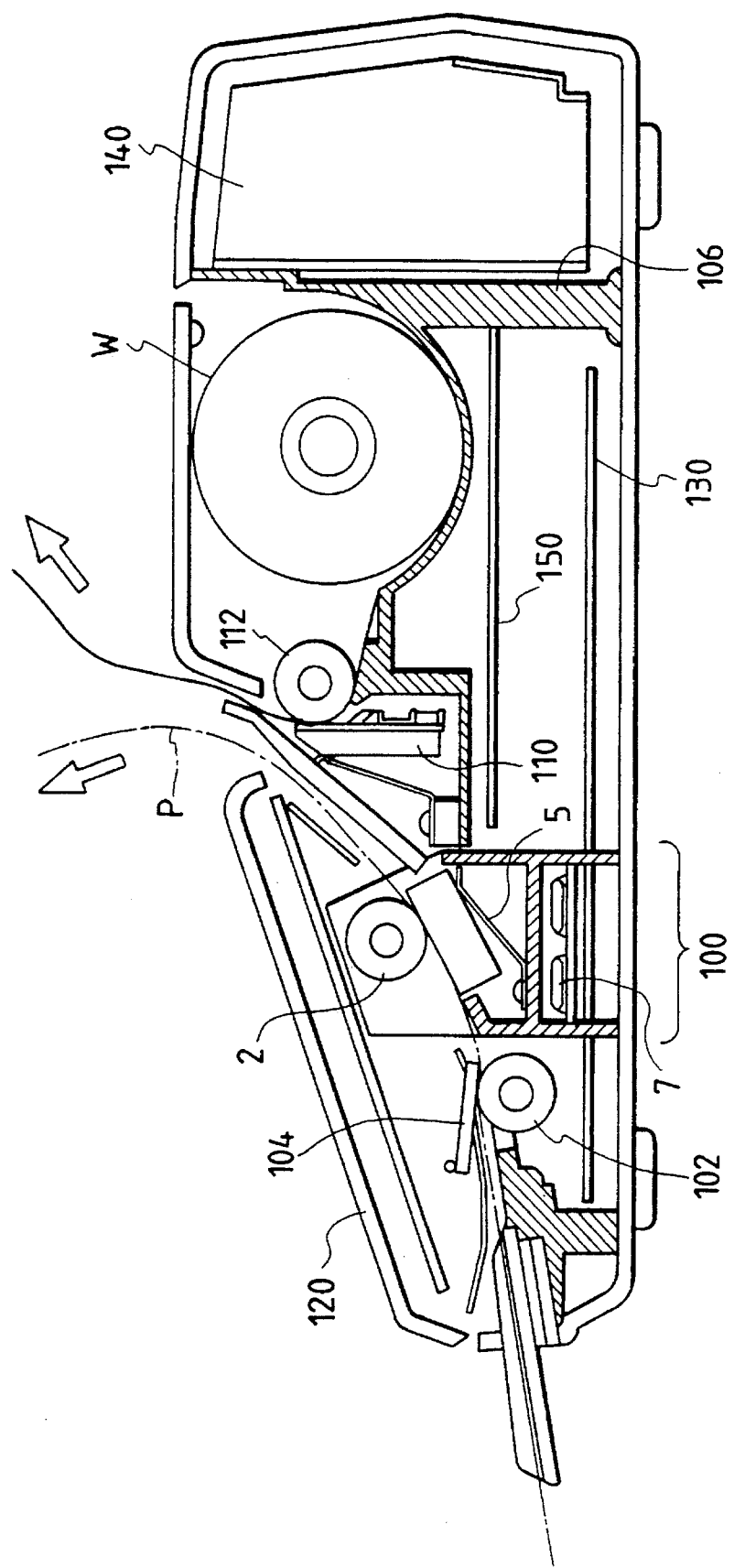
FIG. 5 is a sectional view showing an image information processing apparatus according to the second embodiment of the present invention.

FIGS. 4 and 5 show the second embodiment of the present invention, which includes the structure of the original image reading device shown in FIG. 2. An original image reading device 100 of this embodiment has a unit structure in which a line sensor 1 as an original reading means for optically reading an image of an original P, a platen roller 2 as an original convey means for conveying the original P, and also as an original contact means for bringing the original P to be in tight contact with a reading surface as a reading portion of the line sensor 1, and gears 3 as drive force transmission means for transmitting a drive force from an external unit to the platen roller 2 are integrally locked on a frame 4. Although not shown, a spring may be arranged below the line sensor 1 to urge the line sensor 1 against the platen roller 2. Note that the gears 3 are attached to a shaft 6 arranged on the end portion of the frame, and a roller shaft.

FIG. 4 is a sectional view of the original image reading device of this embodiment. In FIG. 4, the device also includes a leaf spring 5, and an image correction device 7. In this embodiment, the image correction device 7 is arranged on the lower portion of the frame 4, and is connected to the line sensor 1 through wiring lines (not shown). An image correction output signal from the image correction device 7 is output to an image processing board 150 and a system control board 130 through wiring lines (not shown). Note that the image correction device 7 is constituted by electronic components 8.

Figure 1:
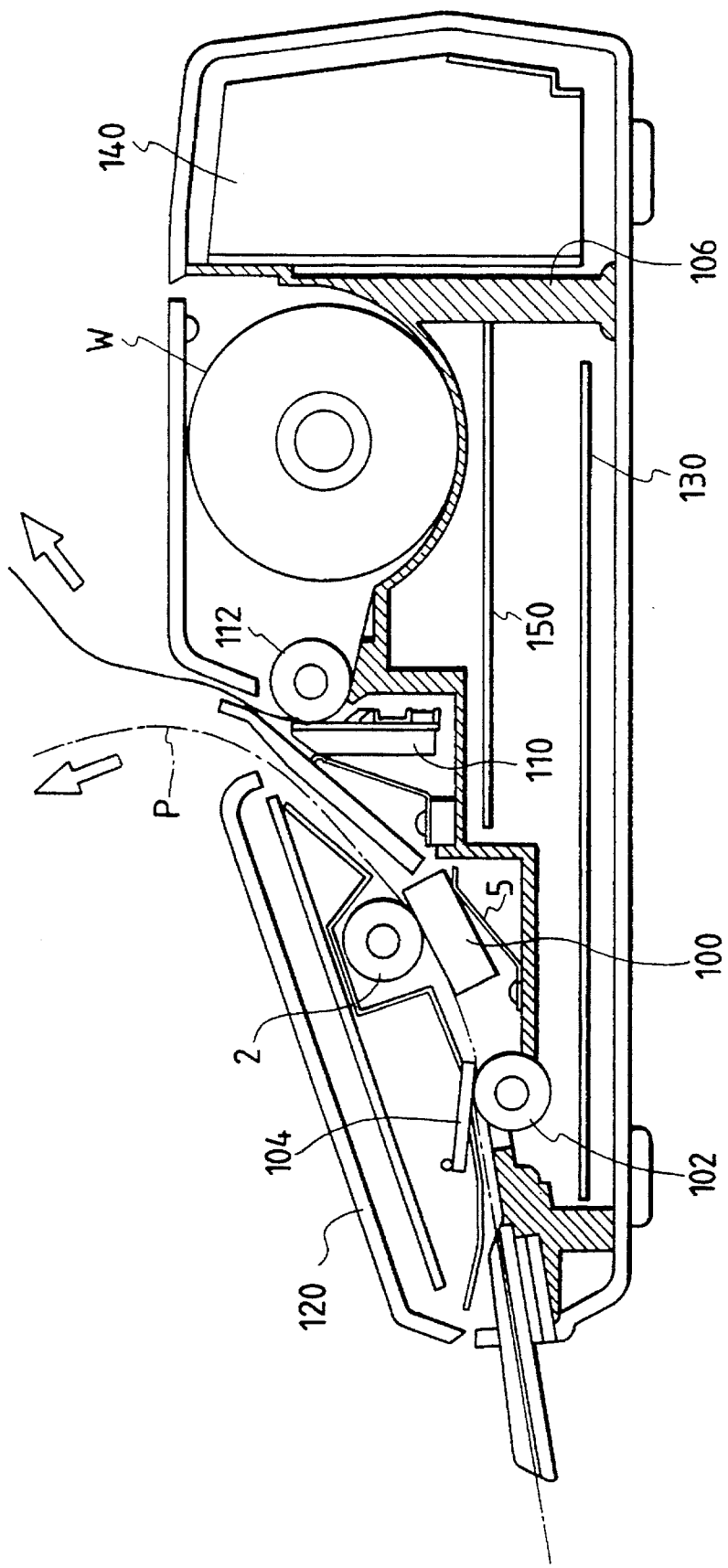
FIG. 1 is a sectional view showing a conventional image information processing apparatus.

FIG. 5 is a sectional view for explaining the structure of an image information processing apparatus of this embodiment, and shows a facsimile apparatus which mounts the original image reading device 100 shown in FIG. 4 in a main body. Note that the same reference numerals in FIG. 5 denote the same parts as in FIG. 1. In this embodiment, the original image reading device 100 is mounted not to be integrally locked on a main body frame 106, but to be detachably locked on a bottom plate separate from the main body frame 106.

In this embodiment, since the image correction device 7 is a small-scale image correction circuit, such as a shading correction circuit, the image processing board 150 is arranged in the image information processing apparatus to execute brightness correction, binary/multi-value image processing, or the like. However, the correction function of the image correction device 7 is not limited to that in this embodiment, and the image correction device 7 should be designed in consideration of various conveniences. Therefore, if the degree of integration of ICs is increased, and the function of the image processing board 150 itself can be integrated on a very small IC chip, the image processing board 150 may be omitted from the main body.

According to this embodiment, the original image reading device, and the image information processing apparatus detachably mounting the device, which can solve the technical subjects of the conventional apparatuses, can be provided.

More specifically, in addition to the above-mentioned effects, since the image reading device incorporates the image correction means, the image processing board of the image information processing apparatus can be reduced in scale or can be omitted. For this reason, since a more compact structure can be realized, and the degree of freedom of the layout can be increased, a compact structure, a decrease in cost, and a short development term can be attained.

(Third Embodiment)

The third embodiment is an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and discharging means for discharging the original are integrally arranged on a frame to constitute a unit structure. According to this embodiment, the original image reading device, which can solve the subjects of the conventional apparatuses, and can meet recent requirements for a compact, lightweight, and inexpensive structure, diversified designs and functions, and the like, can be provided.

According to this embodiment, an image information processing apparatus detachably mounts an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and discharging means for discharging the original are integrally arranged on a frame to constitute a unit structure. Thus, the image information processing apparatus, which can solve the subjects of the conventional apparatuses, and can meet recent requirements for a compact, lightweight, and inexpensive structure, diversified designs and functions, and the like, can be provided.

The third embodiment of the present invention will be described in detail below with reference to the accompanying drawings.

Figure 6:
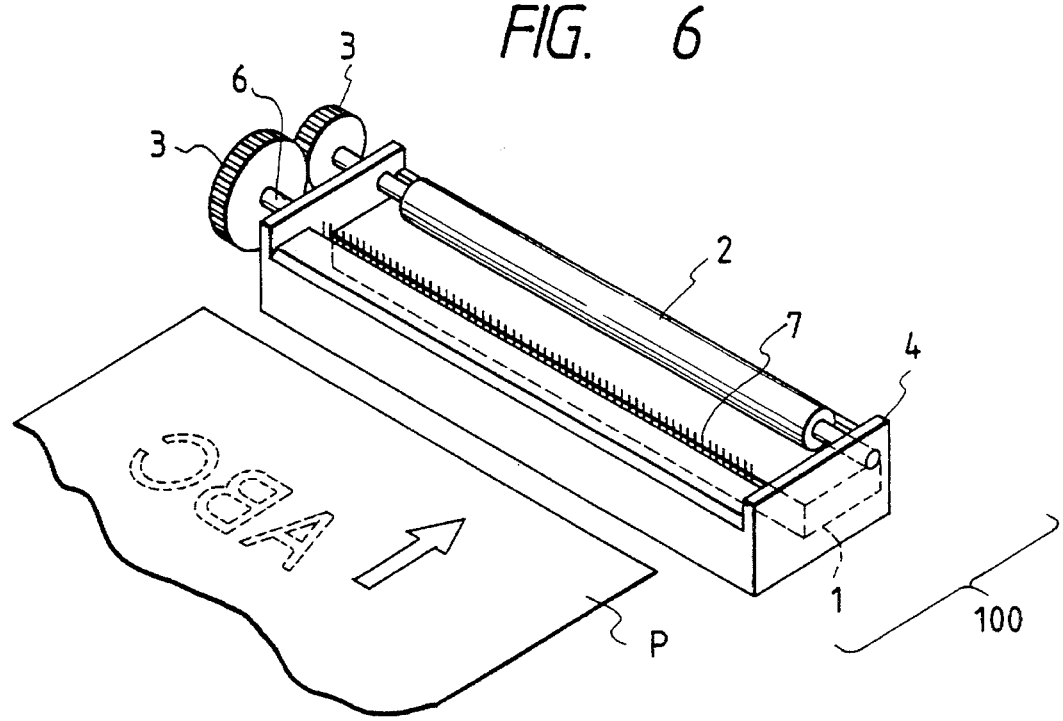
FIG. 6 is a perspective view showing an original image reading device according to the third embodiment of the present invention.

FIG. 6 is a perspective view for explaining the structure of an original image reading device of this embodiment. An original image reading device 100 of this embodiment has a unit structure in which a line sensor 1 as an original reading means for optically reading an image of an original P, a platen roller 2 as an original convey means for conveying the original P, and also as an original contact means for bringing the original P to be in tight contact with a reading surface as a reading portion of the line sensor 1, and gears 3 as drive force transmission means for transmitting a drive force from an external unit to the platen roller 2 are integrally locked on a frame 4. Although not shown, a spring may be arranged below the line sensor 1 to urge the line sensor 1 against the platen roller 2. Note that the gears 3 are attached to a shaft 6 arranged on the end portion of the frame, and a roller shaft. In this embodiment, a discharging means 7 is arranged below the original P (on the reading surface side), but may be arranged above the original P (on the rear surface side). The discharging means is preferably connected to a ground electrode as a reference potential source through wiring lines (not shown ).

FIG. 7 is a sectional view for explaining the structure of an image information processing apparatus of this embodiment, and shows a facsimile apparatus which mounts the original image reading device 100 shown in FIG. 6 in a main body. In this embodiment, the original image reading device 100 is mounted not to be integrally locked on a main body frame 106, but to be detachably locked on a bottom plate separate from the main body frame. FIG. 7 illustrates a spring 5 which is not shown in FIG. 6.

According to the present invention, the original image reading device, and the image information processing apparatus mounting the device, which can solve the subjects of the conventional apparatuses, can be provided.

More specifically, in addition to the above-mentioned effects, since the discharging means is arranged in the original image reading device having high assembling position precision, it can be arranged in a narrow portion, thus allowing a compact, lightweight structure.

(Fourth Embodiment)

The fourth embodiment of the present invention is an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and mounting/aligning means for mounting and aligning the device to an image information processing apparatus, are integrally arranged on a frame to constitute a unit structure. According to this embodiment, the original image reading device, which can solve the subjects of the conventional apparatuses, and can meet recent requirements for a compact, lightweight, and inexpensive structure, diversified designs and functions, and the like, can be provided.

According to this embodiment, an image information processing apparatus detachably mounts an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and mounting/aligning means for mounting and aligning the device to the image information processing apparatus, are integrally arranged on a frame to constitute a unit structure. Thus, the image information processing apparatus, which can solve the subjects of the conventional apparatuses, and can meet recent requirements for a compact, lightweight, and inexpensive structure, diversified designs and functions, and the like, can be provided.

Figure 8:
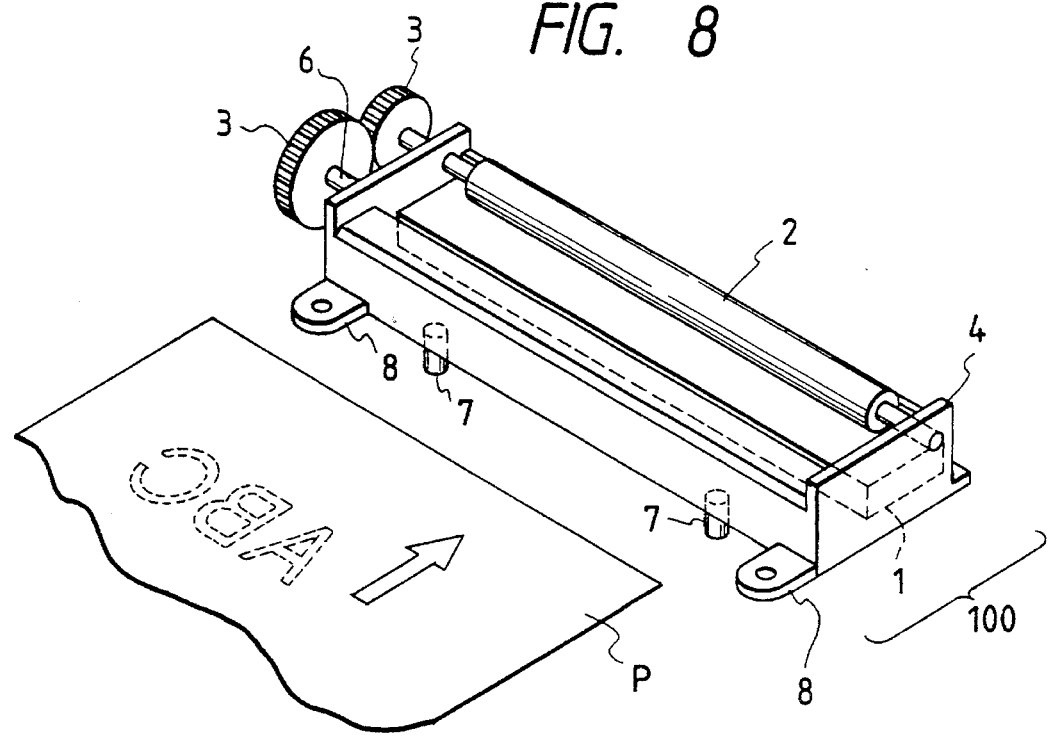
FIG. 8 is a perspective view showing an original image reading device according to the fourth embodiment of the present invention.

FIG. 8 is a perspective view for explaining the structure of an original image reading device of this embodiment. In an original image reading device 100 of this embodiment, a line sensor 1 as an original reading means for optically reading an image of an original P, a platen roller 2 as an original convey means for conveying the original P, and as an original contact means for bringing the original P to be in tight contact with the reading portion of the line sensor 1, gears 3 as a drive force transmission means for transmitting a drive force from an external unit to the platen roller 2, and a pin-like aligning means 7 are integrally locked on a frame 4. As will be described later, the aligning means 7 serves a mounting & aligning member used when the image reading device 100 is assembled in an image information processing apparatus. Although not shown, a spring may be arranged below the line sensor 1 to urge the line sensor 1 against the platen roller 2. Note that the gears 3 are attached to a shaft 6 arranged on the end portion of the frame, and a roller shaft.

Figure 9:
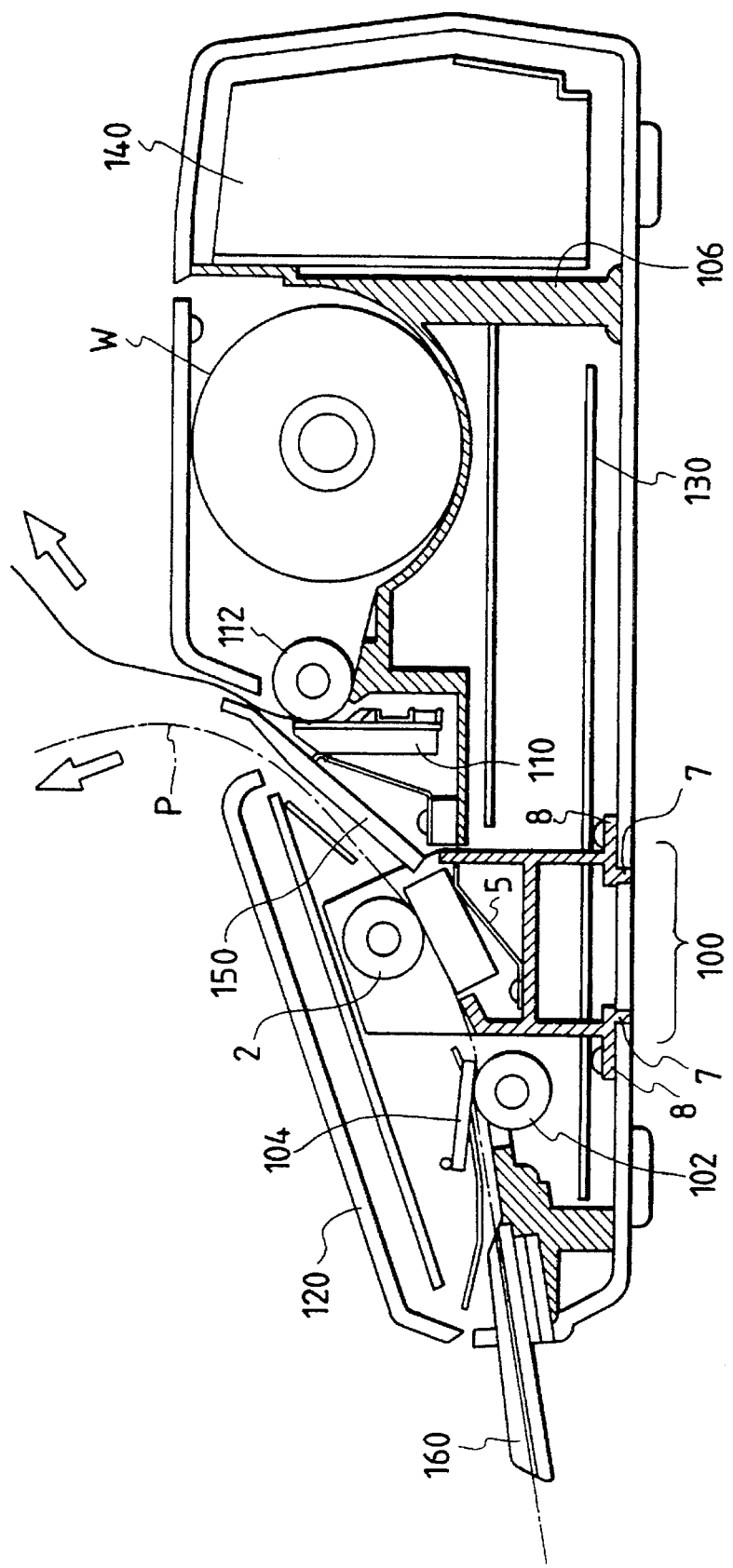
FIG. 9 is a sectional view showing an image information processing apparatus according to the fourth embodiment of the present invention.

FIG. 9 is a sectional view for explaining the structure of an image information processing apparatus of this embodiment, and shows a facsimile apparatus which mounts the original image reading device 100 shown in FIG. 8 in a main body. In this embodiment, the original image reading device 100 is mounted not to be integrally locked on a main body frame 106, but to be detachably locked on a bottom plate separate from the main body frame. Note that FIG. 9 illustrates a spring 5.

In this embodiment, when the original image reading device 100 is mounted on the bottom plate, the relative position between the device 100 and the respective components in the image information processing apparatus is determined using the aligning means 7. When the original image reading device 100 is mounted, mounting position precision for connections between a drive source (not shown) and the gears 3, and mounting position precision for sheet path formation for allowing the smooth flow of the original P from an original table 160 of an image information processing apparatus to the entrance of the original image reading device 100, and the smooth flow of the original P from the exit of the original image reading device 100 to a sheet guide 150, are important in the relative positional relationship between the device 100 and surrounding components. In this embodiment, when the original image reading device 100 is assembled, the pin-like aligning means 7 is fitted in a hole formed in the bottom plate, thereby aligning the original image reading device 100. Thereafter, the original image reading device 100 is fixed on the bottom plate using a mounting means 8 such as a screw. Therefore, the original image reading device 100 can be automatically fixed at the predetermined position on the bottom plate. As a result, the drive source and the gears can be satisfactorily connected, and the sheet path can also be satisfactorily formed.

This embodiment exemplifies an aligning operation using a pin, and a mounting operation using a screw. However, the present invention is not limited to this. The aligning and mounting methods may be appropriately selected in consideration of necessary relative positional precision, a necessary mounting force, a mounting method, and the like.

According to this embodiment, the original image reading device, and the image information processing apparatus mounting the device, which can solve the subjects of the conventional apparatuses, can be provided.

More specifically, in addition to the above-mentioned effects, since the original image reading device has the aligning means for determining the relative position upon mounting on the image information processing apparatus, the mounting operation to the apparatus is easy. In addition, since precision of a necessary portion need only be improved, and a necessary portion of the frame need only be reinforced in the image information processing apparatus, a compact, lightweight structure can be realized.

(Fifth Embodiment)

The fifth embodiment of the present invention is an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and original release means for, when a convey error occurs during a convey operation of the original, releasing the original, are integrally arranged on a frame to constitute a unit structure. According to this embodiment, the original image reading device, which can solve the subjects of the conventional apparatuses, and can meet recent requirements for a compact, lightweight, and inexpensive structure, diversified designs and functions, and the like, can be provided.

According to this embodiment, an image information processing apparatus detachably mounts an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and original release means for, when a convey error occurs during a convey operation of the original, releasing the original, are integrally arranged on a frame to constitute a unit structure. Thus, the image information processing apparatus, which can solve the subjects of the conventional apparatuses, and can meet recent requirements for a compact, lightweight, and inexpensive structure, diversified designs and functions, and the like, can be provided.

Figure 10:
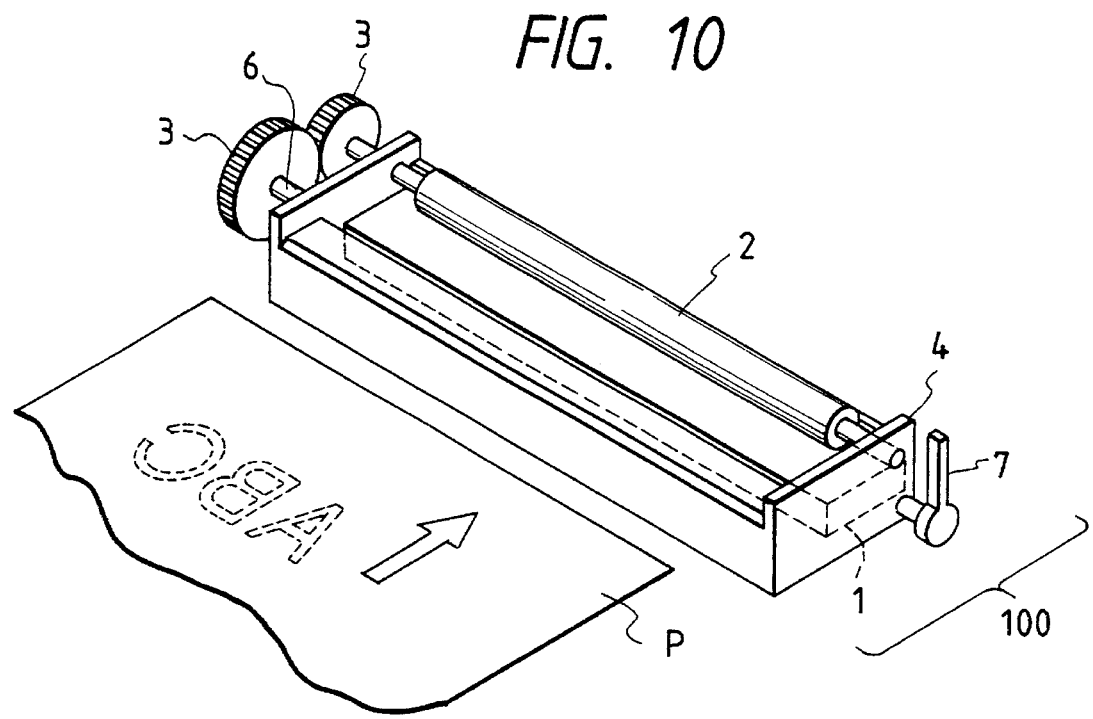
FIG. 10 is a perspective view showing an original image reading device according to the fifth embodiment of the present invention.
Figure 11:
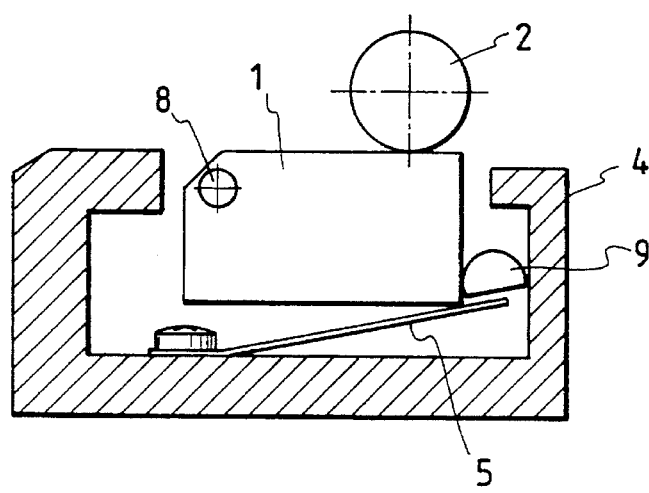
FIG. 11 is a sectional view showing a normal state of the original image reading device shown in FIG. 10.
Figure 12:
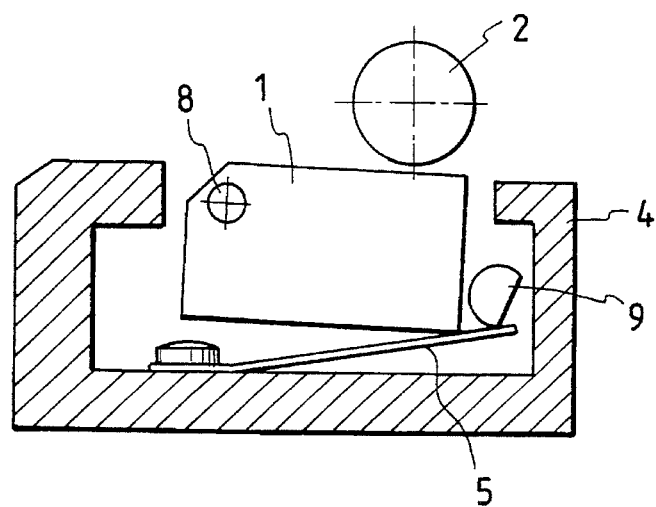
FIG. 12 is a sectional view showing an original release state upon generation of a convey error of the original image reading device shown in FIG. 10.

FIGS. 10, 11, and 12 show the fifth embodiment of the present invention. FIG. 10 is a perspective view for explaining the structure of an original image reading device of this embodiment. In an original image reading device 100 of this embodiment, a line sensor 1 as an original reading means for optically reading an image of an original P, a platen roller 2 as an original convey means for conveying the original P, and as an original contact means for bringing the original P to be in tight contact with the reading portion of the line sensor 1, gears 3 as a drive force transmission means for transmitting a drive force from an external unit to the platen roller 2, and a release lever 7 as a release means for, when a convey error such as paper jam occurs during a convey operation of the original P, removing the Jamming original P, are integrally locked on a frame 4. As shown in FIGS. 11 and 12, a spring 5 is arranged on the lower portion of the line sensor 1, so that the line sensor 1 is urged against the platen roller 2. Note that the gears 3 are attached to a shaft 6 arranged on the end portion of the frame, and a roller shaft.

FIGS. 11 and 12 are sectional views when viewed from the main scanning direction of the line sensor 1 in the original image reading device shown in FIG. 10. The line sensor 1 is supported on the frame 4 to be rotatable about fulcrums 8 arranged at two ends in the main scanning direction as the central axis. The spring 5 is arranged below the line sensor 1, such that one end of the spring 5 is fixed to the inner wall surface of the frame 4, and the other end thereof is in contact with the lower surface of the line sensor 1. The line sensor 1 is pressed upward by the biasing force of the spring. As a result, the line sensor 1 contacts the platen roller 2 at a proper contact force, as shown in FIG. 11. A shaft 9 of the above-mentioned release lever 7 is arranged on the distal end portion of the spring 5. The shaft 9 has a rotatable structure. As shown in FIG. 12, the shaft 9 serves as a cam for pressing the distal end of the spring 5 upon its rotation, and releasing the pressing operation of the line sensor 1 against the platen roller 2.

Normally, the line sensor 1 is in contact with the platen roller 2 by the biasing force of the spring, as shown in FIG. 11, and the original P is fed between the line sensor 1 and the platen roller 2. The original P is fed forward upon rotation of the platen roller 2, and image information on the original P is sequentially optically read by the line sensor 1 simultaneously with the original feed operation. A convey error such as paper jam may occur between the line sensor 1 and the platen roller 2 during a convey operation of the original P depending on the thickness and paper quality of the original P, use environmental conditions, e.g., a humidity and temperature, and the like. When such a convey error occurs, the release lever 7 is turned, so that the line sensor 1 is moved slightly downward by the cam operation of the shaft 9, as shown in FIG. 12. In this manner, the line sensor 1 is separated from the platen roller 2, and the original causing the convey error can be easily removed.

The image information processing apparatus of this embodiment has the same structure as that described above with reference to FIG. 3. In this embodiment, the original image reading device 100 is mounted not to be integrally locked on a main body frame 106, but to be detachably locked on a bottom plate separate from the main body frame.

According to this embodiment, the original image reading device, and the image information processing apparatus mounting the device, which can solve the subjects of the conventional apparatuses, can be provided.

More specifically, in addition to the above-mentioned effects, even when a convey error of an original occurs in the original image reading device during a use of the image information processing apparatus, since the original release means is arranged in the frame, the original can be easily removed.

(Sixth Embodiment)

The sixth embodiment of the present invention is an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and light-shielding means for shielding external light, are integrally arranged on a frame to constitute a unit structure. According to this embodiment, the original image reading device, which can solve the subjects of the conventional apparatuses, and can meet recent requirements for a compact, lightweight, and inexpensive structure, diversified designs and functions, and the like, can be provided.

According to this embodiment, an image information processing apparatus detachably mounts an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and light-shielding means for shielding external light, are integrally arranged on a frame to constitute a unit structure. Thus, the image information processing apparatus, which can solve the subjects of the conventional apparatuses, and can meet recent requirements for a compact, lightweight, and inexpensive structure, diversified designs and functions, and the like, can be provided.

Figure 13:
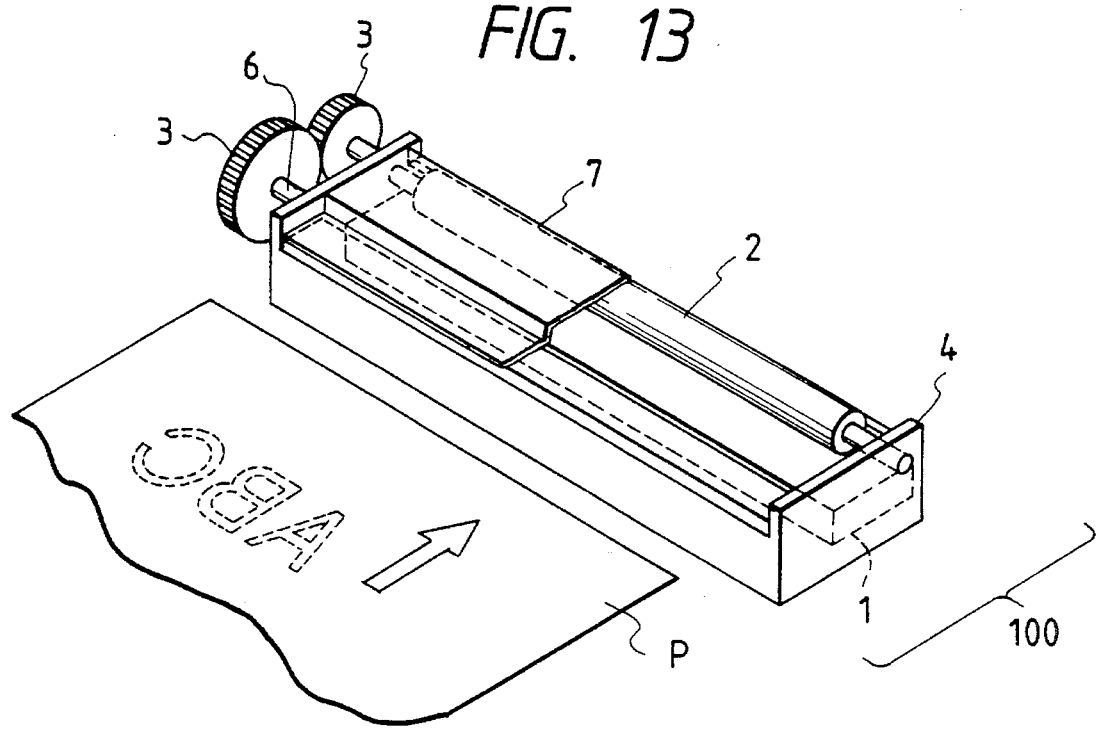
FIG. 13 is a perspective view showing an original image reading device according to the sixth embodiment of the present invention.
Figure 14:
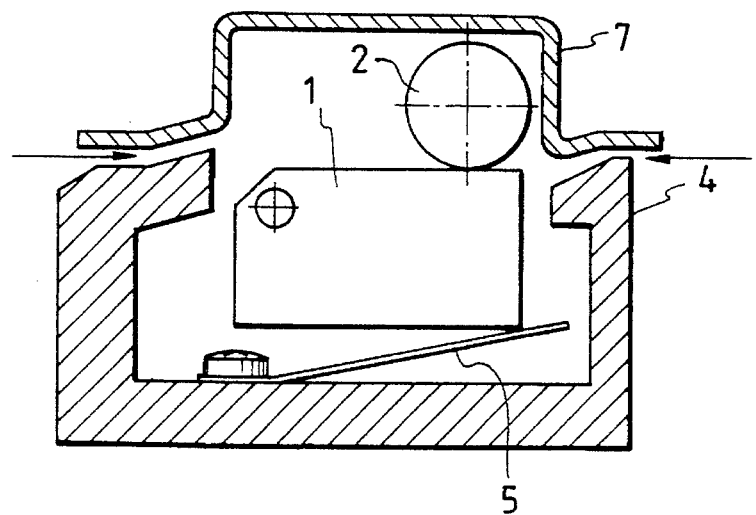
FIG. 14 is a sectional view of the original image reading device shown in FIG. 13.

FIGS. 13 and 14 show an embodiment of the present invention. FIG. 13 is a perspective view for explaining the structure of an original image reading device of this embodiment, and FIG. 14 is a sectional view when viewed from the main scanning direction of the original image reading device shown in FIG. 13. In an original image reading device 100 of this embodiment, a line sensor 1 as an original reading means for optically reading an image of an original P, a platen roller 2 as an original convey means for conveying the original P, and as an original contact means for bringing the original P to be in tight contact with the reading portion of the line sensor 1, gears 3 as a drive force transmission means for transmitting a drive force from an external unit to the platen roller 2, and a light-shielding cover 7 are integrally locked on a frame 4. As shown in FIG. 14, a spring 5 may be arranged below the line sensor 1 to urge the line sensor 1 against the platen roller 2. Note that the gears 3 are attached to a shaft 6 arranged on the end portion of the frame, and a roller shaft. FIG. 13 illustrates only a half of the light-shielding cover 7. The light-shielding cover 7 is fixed to the frame 4 by, e.g., screws. In this embodiment, external light (stray light) is shielded by the light-shielding cover 7 and the frame 4, as shown in FIG. 14. In this case, the frame 4 must be formed of a light-shielding material since it is one constituting element of the light-shielding means.

Figure 15:
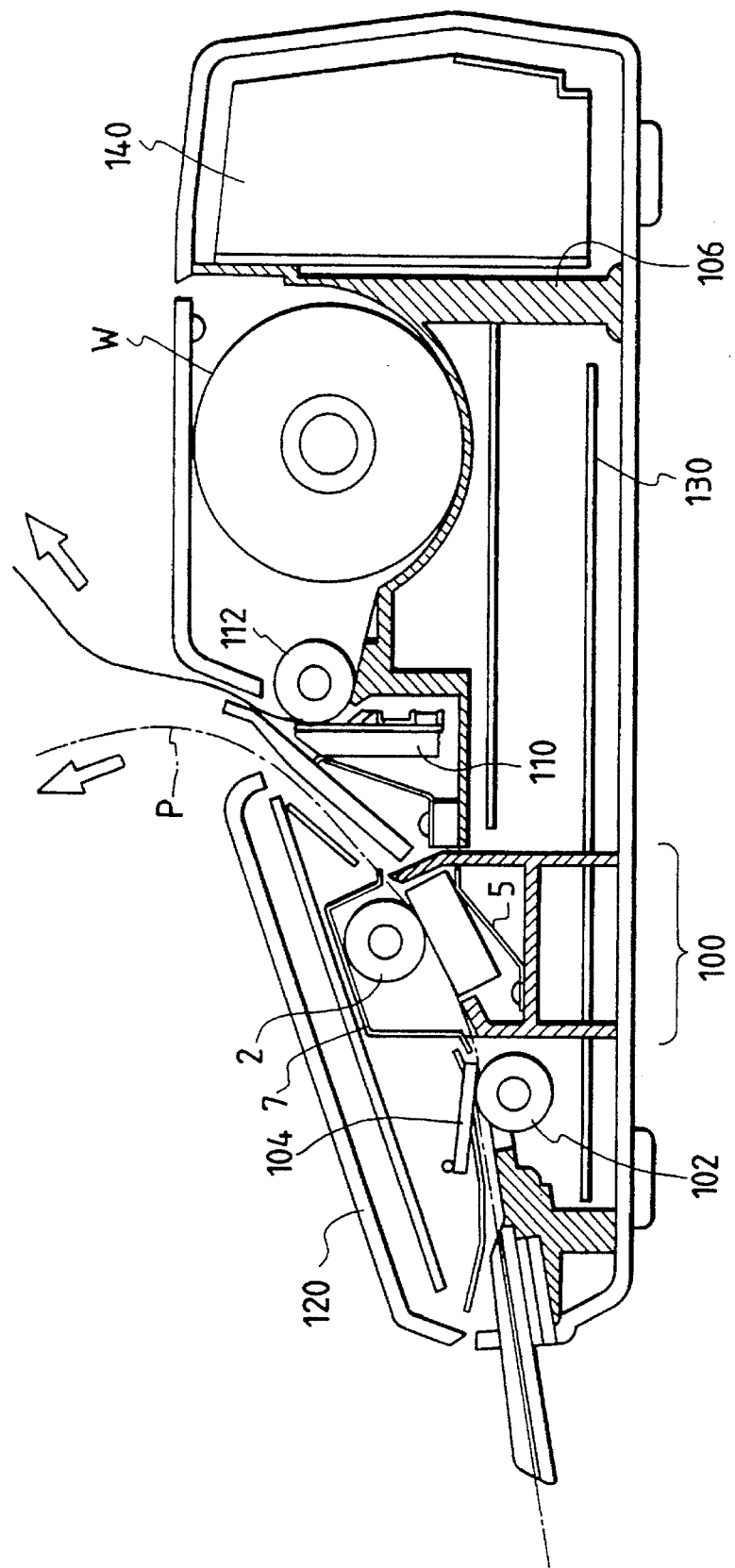
FIG. 15 is a sectional view showing an image information processing apparatus according to the sixth embodiment of the present invention.

FIG. 15 is a sectional view for explaining the structure of an image information processing apparatus of this embodiment, and shows a facsimile apparatus which mounts the original image reading device 100 shown in FIG. 13 in a main body. In this embodiment, the original image reading device 100 is mounted not to be integrally locked on a main body frame 106, but to be detachably locked on a bottom plate separate from the main body frame.

According to this embodiment, the original image reading device, and the image information processing apparatus mounting the device, which can solve the subjects of the conventional apparatuses, can be provided. More specifically, in addition to the above-mentioned effects, 4) Countermeasures against external light (stray light) due to a compact structure, and changes in design and functions can be easily taken. As a result, an inexpensive structure, and a short development term can be realized.

4.1) In order to realize a compact structure, for example, when a main body frame, an operation panel, and the like, are rendered compact, the entrance and the exit of an original must be inevitably arranged near the original image reading device. However, since the original image reading device has a structure in which the original reading means, the original convey means, the original contact means, the drive force transmission means, and the light-shielding means for shielding external light are integrated in a frame, no countermeasure against incidence of external light (stray light) need be taken. Therefore, since external light-shielding means such as a light shutter need not be arranged, an inexpensive structure, and a short development term can be realized.

4.2) Upon a change in design of the image information processing apparatus, the standardized original image reading device of the present invention need only be assembled, and no external light (stray light) shielding means need be considered, thus reducing design and development loads. As a result, an inexpensive structure, and a short development term can be realized.

(Seventh Embodiment)

The seventh embodiment of the present invention is an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and original detection means for detecting the original, are integrally arranged on a frame to constitute a unit structure. According to this embodiment, the original image reading device, which can solve the subjects of the conventional apparatuses, and can meet recent requirements for a compact, lightweight, and inexpensive structure, diversified designs and functions, and the like, can be provided.

According to this embodiment, an image information processing apparatus detachably mounts an original image reading device, in which original reading means for optically reading an image of an original, original convey means for conveying the original, drive force transmission means for transmitting a drive force from an external unit to the original convey means, original contact means for bringing the original to be in tight contact with a reading portion of the original reading means, and original detection means for detecting the original, are integrally arranged on a frame to constitute a unit structure. Thus, the image information processing apparatus, which can solve the subjects of the conventional apparatuses, and can meet recent requirements for a compact, lightweight, and inexpensive structure, diversified designs and functions, and the like, can be provided.

Figure 16:
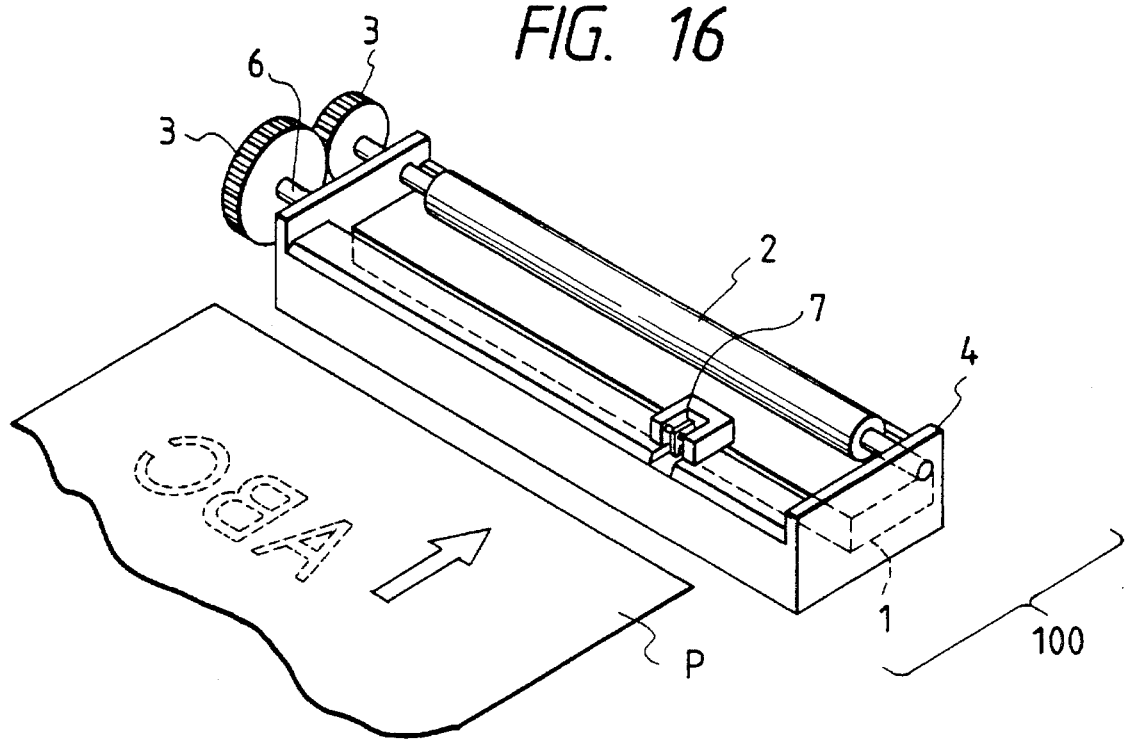
FIG. 16 is a perspective view showing an original image reading device according to the seventh embodiment of the present invention.
Figure 18:
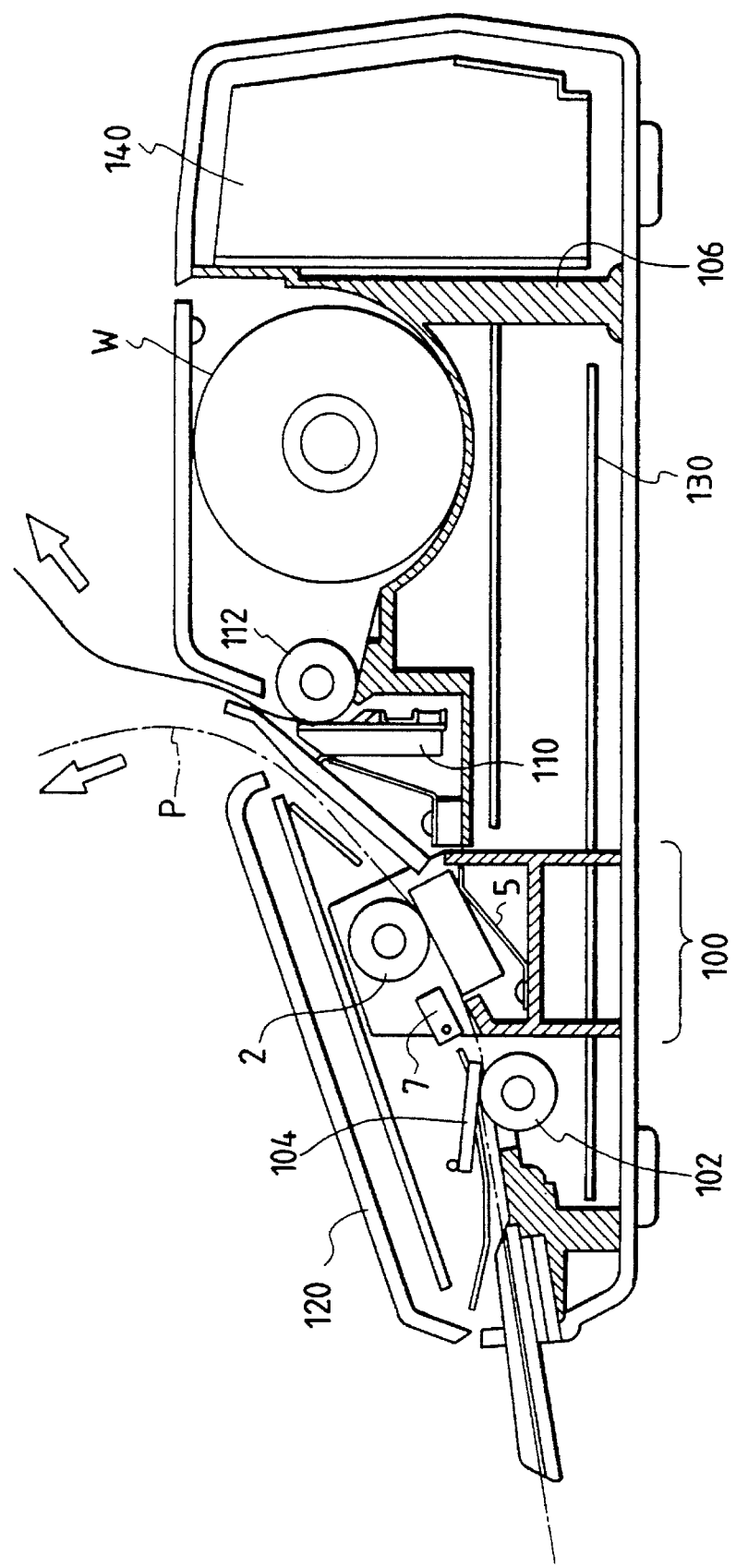
FIG. 18 is a sectional view showing an image information processing apparatus according to the seventh embodiment of the present invention.
Figure 17:
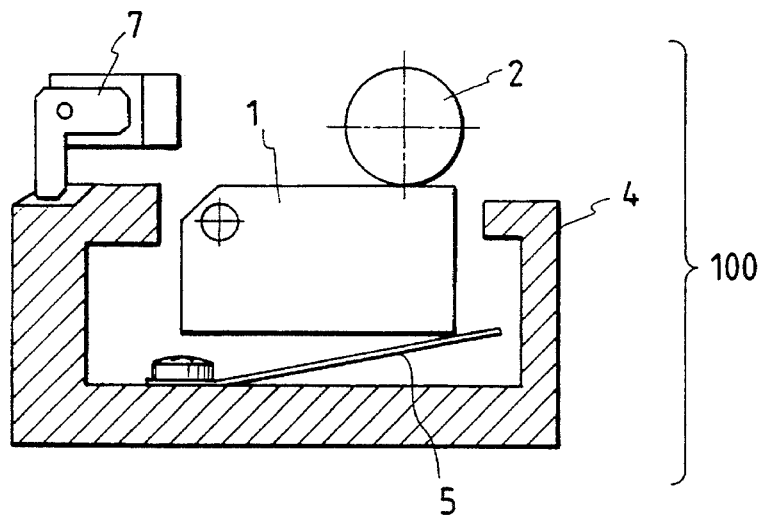
FIG. 17 is a sectional view of the original image reading device shown in FIG. 16.

FIGS. 16, 17, and 18 show the seventh embodiment of the present invention. FIG. 16 is a perspective view for explaining the structure of an original image reading device of this embodiment, and FIG. 17 is a sectional view when viewed from the main scanning direction of the original image reading device shown in FIG. 16. In an original image reading device 100 of this embodiment, a line sensor 1 as an original reading means for optically reading an image of an original P, a platen roller 2 as an original convey means for conveying the original P, and as an original contact means for bringing the original P to be in tight contact with the reading portion of the line sensor 1, gears 3 as a drive force transmission means for transmitting a drive force from an external unit to the platen roller 2, and an original end portion detection sensor 7 as an original detection means for detecting the leading and trailing end portions of the original P, are integrally locked on a frame 4. As shown in FIG. 17, a spring 5 may be arranged below the line sensor 1 to urge the line sensor 1 against the platen roller 2. Note that the gears 3 are attached to a shaft 6 arranged on the end portion of the frame, and a roller shaft.

In this embodiment, when the original P is fed to the original image reading device 100, and the original end portion detection sensor 7 detects the leading end of the original P, the original end portion detection sensor 7 generates a detection signal as a start signal for starting the line sensor 1, and a drive force source such as an external motor.

Upon reception of the start signal, the external drive force source starts its operation, and a drive force is transmitted to the platen roller 2 through the gears 3. The platen roller 2 begins to be rotated by the transmitted drive force, and starts an original feed operation for conveying the original P in a state adjacent to the surface of the line sensor 1. The line sensor 1 also starts an original reading operation, and optically reads image information on the original P passing above the reading portion of the line sensor 1.

The original P is conveyed by the platen roller 2 in this manner, and image information on the original P is read by the line sensor 1 during the convey operation. When the trailing end portion of the original P passes the original end portion detection sensor 7, the original end portion detection sensor 7 supplies a detection signal to the line sensor 1 and the external drive force source as a stop preparation signal. Upon reception of the stop preparation signal, the line sensor 1 and the drive force source stop their operations after the trailing end portion of the original P passes the platen roller 2 through the original end portion detection sensor 7. In the original image reading device of this embodiment, the original end portion detection sensor 7 is arranged near the reading portion of the line sensor 1, and the feed side-of the original P of the platen roller 2, thereby controlling image information reading timings, and convey timings of the original P.

FIG. 18 is a sectional view for explaining the structure of an image information processing apparatus of this embodiment, and shows a facsimile apparatus which mounts the original image reading device 100 shown in FIG. 16 in a main body. In this embodiment, the original image reading device 100 is mounted not to be integrally locked on a main body frame 106, but to be detachably locked on a bottom plate separate from the main body frame.

According to this embodiment, the original image reading device, and the image information processing apparatus mounting the device, which can solve the subjects of the conventional apparatuses, can be provided.

(Eighth Embodiment)

The eighth embodiment of the present invention is an original image reading device, in which original reading means for optically reading an image of an original, original convey means for conveying the original, drive force generation means for driving the original convey means, drive force transmission means for transmitting a drive force from the drive force generation means to the original convey means, and original contact means for bringing the original to be in tight contact with a reading portion of the original reading means, are integrally arranged on a frame to constitute a unit structure. According to this embodiment, the original image reading device, which can solve the subjects of the conventional apparatuses, and can meet recent requirements for a compact, lightweight, and inexpensive structure, diversified designs and functions, and the like, can be provided.

According to this embodiment, an image information processing apparatus detachably mounts an original image reading device, in which original reading means for optically reading an image of an original, original convey means for conveying the original, drive force generation means for driving the original convey means, drive force transmission means for transmitting a drive force from the drive force generation means to the original convey means, and original contact means for bringing the original to be in tight contact with a reading portion of the original reading means, are integrally arranged on a frame to constitute a unit structure. Thus, the image information processing apparatus, which can solve the subjects of the conventional apparatuses, and can meet recent requirements for a compact, lightweight, and inexpensive structure, diversified designs and functions, and the like, can be provided.

Figure 19:
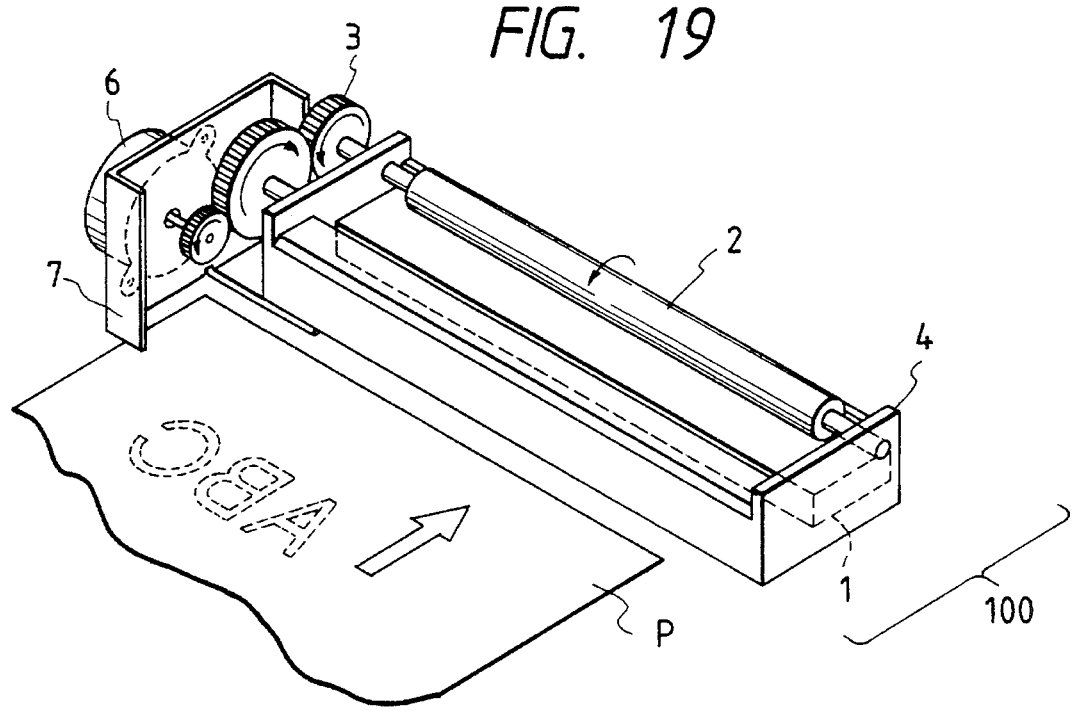
FIG. 19 is a perspective view of an image reading device according to the eighth embodiment of the present invention.

FIG. 19 is a perspective view for explaining the structure of an original image reading device of this embodiment. In an original image reading device (or reader) 100 of this embodiment, a line sensor 1 as an original reading means for optically reading an image of an original P, a platen roller 2 as an original convey means for conveying the original P, and as an original contact means for bringing the original P to be in tight contact with the reading portion of the line sensor 1, a motor 10 as a means for generating a drive force for rotating the platen roller 2, and gears 3 as a drive force transmission means for transmitting the drive force from the motor 6 to the platen roller 2, are integrally locked on a frame 4. The motor 6 is locked on the frame 4 by a mounting member 11. The mounting member 11 also has a function of radiating heat generated from the motor 10. Note that a spring may be arranged below the line sensor 1 to urge the line sensor 1 against the platen roller 2.

The image information processing apparatus of this embodiment is the same as that shown in FIG. 3.

Figure 20:
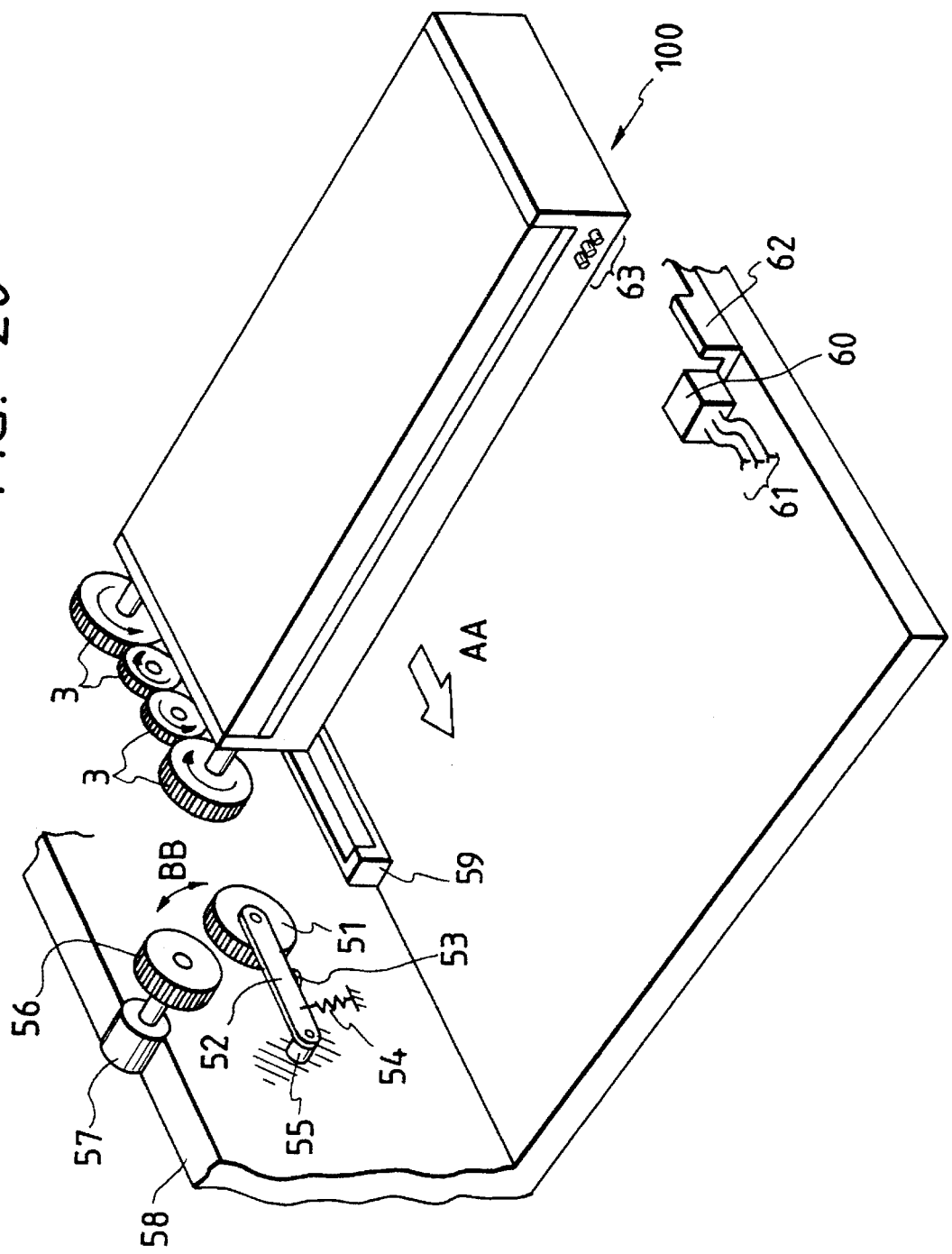
FIG. 20 is a perspective view showing a state wherein the original reading device is mounted on the image information processing apparatus of the present invention.

FIG. 20 is a perspective view showing a state wherein the unit 100 according to the present invention is mounted on the apparatus main body. The unit 100 is mounted while being moved along guides 59 and 62 in a direction parallel to a direction of an arrow AA. The longer guide 59 has a stopper at its end portion, and the shorter guide 62 has a connector 60 also serving as a stopper at its end portion. The connector 60 can be electrically connected to signal terminals 63 of the unit 100. The signal terminals 63 include lines for transmitting a drive signal for the line sensor 1, an image signal from the line sensor 1, a reference signal, and the like. When the terminals 63 contact the connector 60, they can be electrically connected to and controlled by the main body side through wiring lines 61.

A motor 57 as a drive source is fixed on the side wall portion of a main body frame 58 to which the above-mentioned members 59 to 62 are fixed. A gear 56 is attached to the motor 57, and is meshed with a gear 51 when the unit 100 is mounted, thereby transmitting the drive force of the motor 57 to gears 14 of the unit via the gear 51. The rollers 2 and 12 are rotated by the transmitted drive force. The gear 51 is rotatably mounted on an arm 52, which is pivotal about a shaft 55 fixed to the side wall. The gear 51 is swingable in a direction of an arrow BB with respect to the shaft 55. When the unit 100 is not mounted, the arm 52 is biased downward by a spring 54. A stopper 53 is arranged below the arm 52, thereby regulating the pivotal movement of the arm 52.

As the unit is moved in the direction of the arrow AA (FIG. 20), a gear 14-1, arranged on the shaft of the paper feed roller 12, of the transmission gears 14, is brought into contact with the gear 51. The gear 51 is pushed upward against a biasing force CC by the gear 14-1, and is brought into contact with the gear 56 of the drive source.

When the Unit is further moved, its movement is regulated by stoppers 59 and 60, and at the same time, electrical connections by the connector 60 are also completed. At this time, the gears 14-1, 51, and 56 are perfectly meshed with each other.

Figure 21:
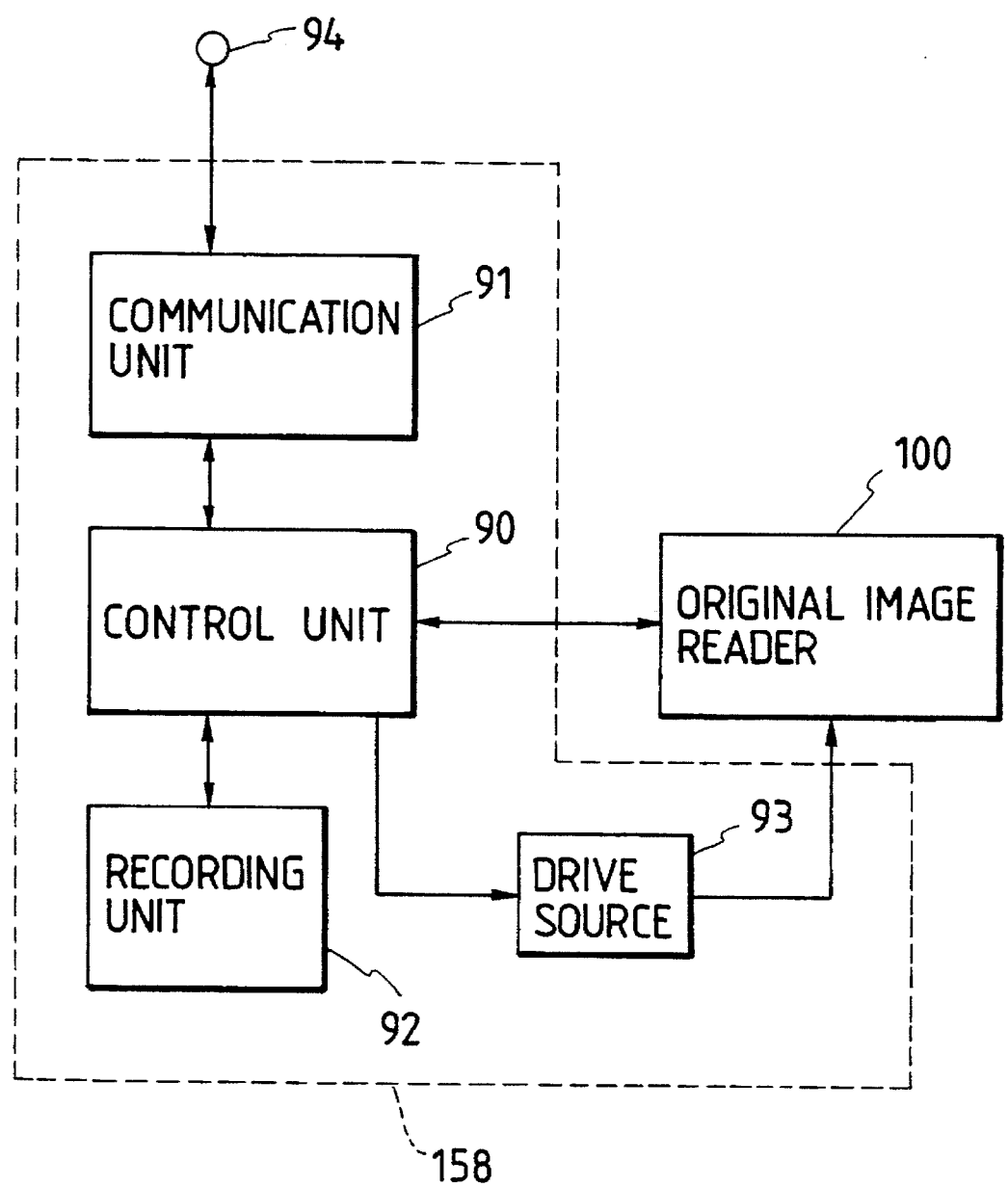
FIG. 21 is a block diagram showing a control system of the image information processing apparatus of the present invention.

FIG. 21 is a block diagram of a control system for explaining a facsimile apparatus having the original image reading device of this embodiment.

When the original P is loaded in the original image reader 100, and a transmission operation is started, the convey rollers in the reader 100 are rotated by a drive source 93 to feed the original, and the line sensor reads image information. This information is stored, as an electrical signal, in a memory in a control unit 90.

When an external line 94 connected to a transmission destination is connected by a communication unit 91, an image signal in the memory is transmitted through the communication means.

As the unit 100, the original image reading devices Of the first to eighth embodiments can be applied.

A recording unit 92 records a transmitted image signal on a recording medium, and can comprise a thermal head, an ink-jet recording head, or the like.

According to the present invention that has been described as the embodiments, the technical subjects of the conventional apparatuses can be solved. More specifically, aligning precision and parts precision upon assembling can be improved. In addition, a design load and cost upon a change in package or function of the apparatus main body can be reduced.

Furthermore, repair can be facilitated.

What is claimed is:

1. An original image reading device, for an image information processing apparatus which has a main body including means for generating a drive force to convey an original, said original reading device comprising:

reading means for reading image information on a front surface of the original;

original conveying means adapted to be in contact with a back surface of the original and convey the original;

drive force transmission means for transmitting said drive force from the main body of the information processing apparatus to said original conveying means; and supporting means detachable from the main body of the information processing apparatus, wherein said reading means, said original conveying means and said drive force transmission means are assembled on said supporting means, so that said device is, integrally with said reading means and said original conveying means, also detachable from the main body of the information processing apparatus.

2. A device according to claim 1, further comprising correction means for correcting an image signal from said reading means.

3. A device according to claim 1, further comprising discharging means for discharging the original.

4. A device according to claim 1, further comprising means for aligning and mounting said device to said apparatus main body.

5. A device according to claim 1, further comprising release means for separating said reading means and said original convey means relative from each other.

6. A device according to claim 1, further comprising light-shielding means.

7. A device according to claim 1, further comprising original detection means for detecting the presence/absence of the original.

8. An original image reading device, for an image information processing apparatus which has a main body capable of mounting said device thereon, said original image reading device comprising:

reading means for reading image information on a front surface of an original;

original conveying means adapted to be in contact with a back surface of the original and convey the original;

drive force generating means for generating a drive force to convey the original; and supporting means detachable from the main body, wherein said reading means, said original conveying means and said drive force generating means are assembled on said supporting means, so that said device is, integrally with said reading means and said original conveying means, also detachable from the main body.

9. An image information processing apparatus comprising:

a main body including a mounting portion and means for generating a drive force to convey an original;

an original image reading device mounted on the mounting portion, said original image reading device including reading means for reading image information on a front surface of the original, original conveying means adapted to be in contact with a back surface of the original and convey the original, drive force transmission means for transmitting said drive force from said main body to the original conveying means, and supporting means detachable from the mounting portion, wherein the reading means, the original conveying means and the drive force transmission means are assembled on the supporting means, so that said device is, integrally with the reading means and the original conveying means, also detachable from the mounting portion.

10. An image information processing apparatus comprising:

a main body including a mounting portion;

an original image reading device mounted on the mounting portion, said device including reading means for reading image information on a front surface of an original, original conveying means adapted to be in contact with a back surface of the original and convey the original, drive force generating means for generating a drive force to convey the original, and supporting means detachable from the mounting portion, wherein the reading means, the original conveying means and the drive force generating means are assembled on the supporting means, so that said device is, integrally with the reading means and the original conveying means, also detachable from the mounting portion.

11. An apparatus according to claim 9, wherein said main body has a communication means.

12. An apparatus according to claim 9, wherein said main body has a recording means.

13. An apparatus according to claim 9, wherein said main body has an ink jet recording head.

14. An apparatus according to claim 9, wherein when said original image reading device is mounted on said mounting portion, a gearing provided in said original image reading device engages with a gearing provided in said main body.

15. An apparatus according to claim 9, wherein said original conveying means is a platen roller.

16. An apparatus according to claim 9, wherein said original conveying means is a roller for bringing the original in close contact with a reading surface of said reading means.

17. An apparatus according to claim 10, wherein said main body has a communication means.

18. An apparatus according to claim 10, wherein said main body has a recording means.

19. An apparatus according to claim 10, wherein said main body has an ink jet recording head.

20. An apparatus according to claim 10, wherein said original conveying means comprises a platen roller.

21. An apparatus according to claim 10, wherein said original conveying means comprises a roller for bringing the original in close contact with a reading surface of said reading means.

22. A device according to claim 1, wherein said original conveying means comprises a platen roller.

23. A device according to claim 1, wherein said original conveying means is a roller for bringing the original in close contact with a reading surface of said reading means.

24. A device according to claim 8, wherein said original conveying means comprises a platen roller.

25. A device according to claim 8, wherein said original conveying means comprises a roller for bringing the original in close contact with a reading surface of said reading means.

* * * * *